United States Patent
Kaushik

(10) Patent No.: US 11,006,422 B2
(45) Date of Patent: May 11, 2021

(54) OPTIMIZATION OF MU-MIMO BEAMFORMING IN A WI-FI COMMUNICATION NETWORK BASED ON MOBILITY PROFILES

(71) Applicant: Meru Networks, Sunnyvale, CA (US)

(72) Inventor: Anil Kaushik, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/698,647

(22) Filed: Sep. 8, 2017

(65) Prior Publication Data

US 2018/0070345 A1  Mar. 8, 2018

Related U.S. Application Data

(63) Continuation of application No. 14/937,845, filed on Nov. 10, 2015, now Pat. No. 9,769,828.

(51) Int. Cl.
*H04W 72/04*  (2009.01)
*H04B 7/0452*  (2017.01)
*H04W 8/24*  (2009.01)
*H04B 7/0417*  (2017.01)
*H04W 84/12*  (2009.01)

(52) U.S. Cl.
CPC ........ *H04W 72/046* (2013.01); *H04B 7/0417* (2013.01); *H04B 7/0452* (2013.01); *H04W 8/24* (2013.01); *H04W 84/12* (2013.01)

(58) Field of Classification Search
CPC . H04B 7/0417; H04B 7/0452; H04W 72/046; H04W 84/12; H04W 8/24
See application file for complete search history.

(56) References Cited

U.S. PATENT DOCUMENTS

| | | | |
|---|---|---|---|
| 9,507,008 B1 * | 11/2016 | Thiagarajan | G01S 5/021 |
| 2013/0286959 A1 * | 10/2013 | Lou | H04W 72/04 370/329 |
| 2015/0009921 A1 | 1/2015 | Papadopoulos | |
| 2016/0142115 A1 | 5/2016 | Onggosanusi | |

* cited by examiner

*Primary Examiner* — Jianye Wu
(74) *Attorney, Agent, or Firm* — Law Office of Dorian Cartwright; Dorian Cartwright

(57) ABSTRACT

An access point associated on Wi-Fi portion of the communication network selectively groups stations according to a mobility profile. The mobility profile includes factors that characterize at least an amount of movement and current location for a station. Each station is assigned to a beamforming group of similar mobility profiles. A type of beamforming transmission is selected for each beamforming group based on mobility profiles of associated stations. The type of beamforming transmissions including at least MU-MIMO and SU-MIMO. Data is then transmitted to the stations of each beamforming group according to the selected type of beamforming transmissions. A Wi-Fi controller, having a network-wide view of conditions and being able to collect historical information about stations during connections to other access points, is able to provide data unique data to group selections.

16 Claims, 5 Drawing Sheets

FIG. 5
520

OPTIMIZATION OF MU-MIMO BEAMFORMING IN A WI-FI COMMUNICATION NETWORK BASED ON MOBILITY PROFILES

CROSS-REFERENCE TO RELATED APPLICATIONS

This application claims priority as a continuation of U.S. patent application Ser. No. 14/937,845, filed Nov. 10, 2015, the contents of which hereby incorporated by reference in its entirety.

FIELD OF THE INVENTION

The invention relates generally to Wi-Fi computer networking, and more specifically, to grouping stations on a Wi-Fi network according to a mobility profile that optimizes beamforming.

BACKGROUND

Beamforming in a Wi-Fi network occurs during wireless data transfers between transmitters (i.e., a beamformer) and receivers (i.e., a beamformee) such as access points and stations. More specifically, rather than broadcasting a signal to a wide area to reach a target, beamforming concentrates the signal directly at the target that is faster, stronger, and has a longer range, with improved SNR (signal-to-noise ratio). Beamforming is enabled by transmitters and receivers that use MIMO (multiple-input, multiple-output) technology. Data is sent using multiple antennas to increase throughput and range with propagation over multiple paths.

Previous standards such as IEEE 802.11n (promulgated by the Institute of Electrical and Electronics Engineers) support beamforming capability, but without any specific direction on how it is to be implemented. Consequently, a router or access point may not be compatible with a station having a different implementation. Newer standards such as IEEE 802.11ac and IEEE 802.11ac wave 2 provide particular protocols for beamforming as to how transmitters and receivers communicate with each other and provide information about their relative positions. This will increase the number of beamforming enabled products brought to market.

With the advent of MU-MIMO (multiple user MIMO), antennae can now transmit to multiple receivers at the same time rather than being limited to a single user at a time under SU-MIMO (single user MIMO). Multi user beamforming is significantly more time-dependent than single user and therefore can require up to date channel information as the spatial arrangement of multiple receivers changes.

However, beamforming measurements are very costly and will bring down throughput if not done accurately. One beamforming feedback for a single receiver could cost 0.5 to 1% of airtime. Receivers that constantly change locations need more beamforming measurements to prevent stale data. On the other hand, receivers that do not move or change locations infrequently waste computing and network resources with unnecessary beamforming measurements.

Because stations in IEEE 802.11 protocols select access points, a resulting configuration of stations for access points can have disparate beamforming requirements. In other words, one station can be relatively stationary and only require a single measurement while another station can be very mobile and require frequent measurements, while the transmitter is forced to also frequently measure the relatively stationary station when using MU-MIMO.

What is needed is a robust technique for optimizing beamforming with stations selectively grouped according to mobility profiles. Groups leverage the advantages of MU-MIMO while avoiding the higher resource overhead by selectively using SU-MIMO.

SUMMARY

These shortcomings are addressed by the present disclosure of methods, computer program products, and systems for automatically grouping stations in a Wi-Fi network based on mobility profiles for optimizing beamforming.

In one embodiment, an access point associated with stations over a Wi-Fi portion of the communication network. The access point and the stations have MU-MIMO capability. A mobility profile is determined for each station of the plurality of stations. The mobility profile includes factors that characterize at least an amount of movement and current location for a station. Each station is assigned to a beamforming group of similar mobility profiles. A type of beamforming transmission is selected for each beamforming group based on mobility profiles of associated stations. The type of beamforming transmissions including at least MU-MIMO and SU-MIMO. Data is then transmitted to the stations of each beamforming group according to the selected type of beamforming transmissions.

In another embodiment, a default beamforming group is assigned based on device type and/or history if available. Groups are updated as new information is collected and mobility profiles are updated.

In yet another embodiment, a Wi-Fi controller that manages multiple access points over the communication network contributes or commandeers group assignments. The Wi-Fi controller, having a network-wide view of conditions and being able to collect historical information about stations during connections to other access points, is able to provide data unique data to group selections.

Advantageously, the operation of computerized access points is improved. Beamforming groups leverage the advantages of MU-MIMO while avoiding the higher resource overhead by selectively using SU-MIMO

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for automatically grouping stations for optimal beamforming transmissions based on mobility profiles. As referred to herein, one embodiment of beamforming sends frames to spatially diverse locations at the same time. Certain antennae concentrate MIMO signals from a transmitter to one or more receivers. In Wi-Fi, beamforming is typically downlink from access points to stations due to more resources in access points, but uplink beamforming is also possible. One of ordinary skill in the art will recognize that many other scenarios are possible, as discussed in more detail below.

Systems to Group Stations Based on Mobility Profiles (FIGS. 1-4)

Figure 1:
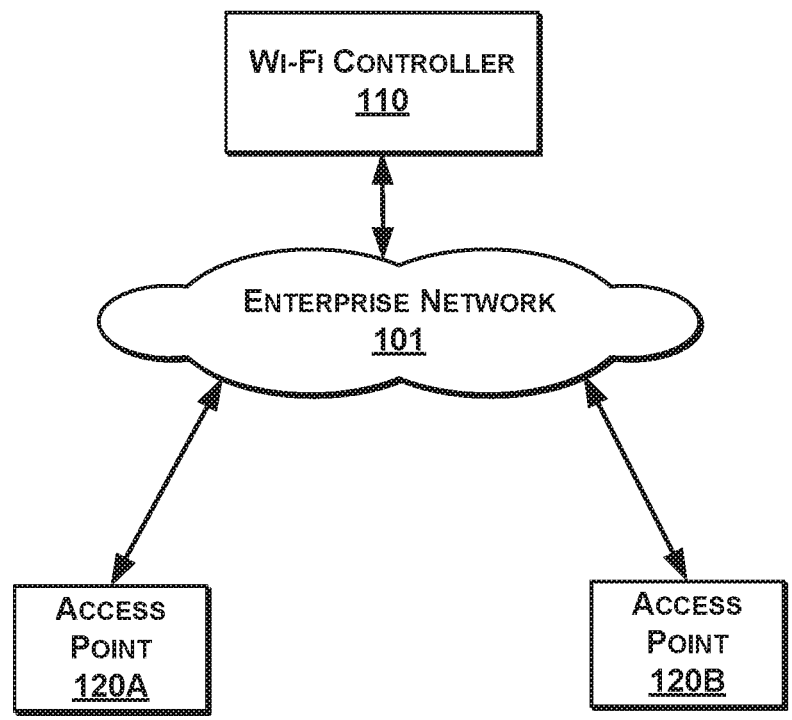
FIG. 1 is a high-level block diagram illustrating a system to group stations in a Wi-Fi network based on mobility, according to one embodiment.
Figure 1:
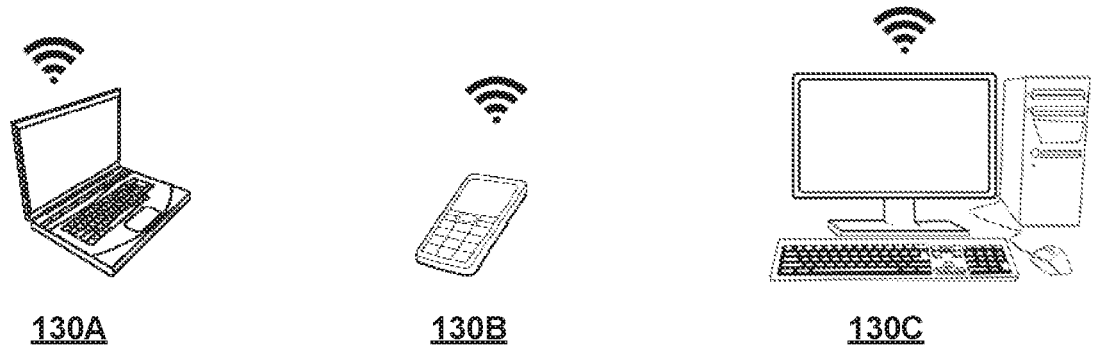

FIG. 1 is a high-level block diagram illustrating a system 100 to group stations in a Wi-Fi network based on mobility profiles, according to one embodiment. The system 100 comprises a controller, access points 120A,B and stations 130A-C. Additional network components can also be part of the system 100, such as firewalls, virus scanners, routers, switches, application servers, databases, as well as additional controllers, access points, access switches, stations, and the like. For instance, embodiments of the system 100 can be implemented in conjunction with a network security system, for example, the FortiGate Network Security platform by Fortinet of Sunnyvale, Calif. The network components can be implemented as hardware, software, or a combination of both.

The enterprise network 101 is accessed by mobile and non-mobile stations via access points with beamforming transmission capability. In more detail, the enterprise network 101 couples to each of the Wi-Fi controller 110 and the access points 120A,B for communication, preferably over a wired communication channel such as Ethernet. In turn, the stations 130A-C can be wireless coupled in communication with the access points 120A,B (i.e., a Wi-Fi portion of the system 100). Wireless components preferably use communication protocols such as IEEE 802.11 n and IEEE 802.11 ac wave 2, in addition to other protocols such as other IEEE 802.11s, IEEE 802.3, Bluetooth, 3G and 4G. The enterprise network 101 can serve, for example, a business enterprise, a hospital or system of hospital, school, building, a private network, or the like. The enterprise network 101 can provide access to a wide area network or the Internet in some embodiments. Alternatively, the enterprise network 101 can be distributed over the Internet, in other embodiments. A combination of wired and wireless devices can be connected, as well as only wireless devices or only wired devices. The enterprise network 101 can be, for example, the Internet, a cellular network, a larger enterprise network to which the enterprise network 101 is a smaller component of, or a combination of network types.

In one embodiment, the access points 120A,B generate a mobility profile for stations and group stations accordingly, each group having specific beamforming feedback measuring requirements. The access points 120A,B can operate according to IEEE 802.11ac wave 2, for example, which has beamforming transmission capabilities for downlink communications to stations. In other words, different data streams can be directed by antenna to spatially diverse locations at the same time. Optionally, specific transmissions for a specific beamforming group can be dedicated to certain antenna or certain access points for optimization. When a new station associates, the access points 120A,B can assign a default mobility profile based on device type or user type, in some cases. A history of movement is tracked for stations so that mobility profiles can be updated, and as a result, groups rearranged for optimal beamforming. Further, one embodiment stores mobility profiles for use when reassociating with an access point or for sharing with other access points.

One embodiment divides mobility profiles into three categories: mobile, semi-mobile, and stationary. Other embodiments can have more or fewer categories. Each category can be defined by quantitative values. Some embodiments use device type for default categorization, such that smart phones can be categorized as mobile, while laptops are categorized as semi-mobile and PCs are categorized as stationary. Over time, categories can be shift because a smart phone can be affixed to a desk for use as a hot spot, keeping it stationary. On the other end, a PC can be moved to a new office every day based on business needs. For the beamforming groups having relatively high mobility, beamforming feedback measurements are taken more often to optimize beamforming transmissions. Advantageously, however, for the beamforming groups having relatively low mobility, beamforming feedback measurements are not taken or are taken less often because the information does not change or changes to a lesser extent. As a result, fewer computing resources are spent on static or slowly changing beamforming feedback measurements by selectively using SU-MIMO mode instead of MU-MIMO mode.

Determination of mobility characteristics, in one case, is based on RSSI (received signal strength indicator) measurements. RSSI is measured for each station and stored as an estimate of location. Cooperating access points can triangulate locations. Subsequent RSSI values are measures and compared against stored values for evidence of mobilization. Moreover, stations that hand off frequently between different access points are likely to be mobile. Mobility and/or location are factors used for grouping the stations 130A-C.

To provide network service to the station 130, in one embodiment, the access points 120A, B comply with IEEE 802.11 protocols to provide Wi-Fi service to the station 130 over wireless communication channels. Under IEEE 802.11, a beacon with one or more BSSIDs (basic service set identification) is periodically sent to advertise a presence for new connections and maintain current connections. Then access points listen for packets addressed to associated BSSIDs and ignore packets addressed to unassociated BSSIDs. Furthermore, the access point 130 forward packets addressed to MAC (Media Access Control) addresses of associated stations.

The access points 120A, B physically include one or more individual access points implemented in any of the computing devices discussed herein (e.g., see FIG. 9). For example, the access point 130 can be an AP 110 or AP 433 (modified as discussed herein) by Meru Networks of Sunnyvale, Calif. A network administrator can strategically place the access point 130 for optimal coverage area over a locale. The access point 130 can, in turn, be connected to a wired hub, switch or router connected to the enterprise network 199 (or an external network). In one embodiment, access point functionality is incorporated into a switch or router. In another embodiment, the access points 120A,B are virtual devices.

The stations 130A-C use the access points 120A,B without any information about beamforming groups, according to one embodiment. However, in another embodiment, the stations 130A-C can be aware of beamforming groups as well as the mobility constraints required to remain in the grouping. For example, a typically mobile device such as a smartphone may need access to a MU-MIMO channel intended for more stationary devices in order to increase downlink speed. The stations 130A-C may also actively or passively participate in beamforming feedback measurements (e.g., reply to NDP or null data packet frames), as needed.

Different degrees of mobility of the stations 130A-C are characterized by the mobility profiles. In some embodiments, untethered devices are mobilized while in use, such as when a person walks and talks on a smart telephone. In this case, untethered devices are handed-off from one access point to another while moving around the coverage area. In other embodiments, tethered devices can be shut down and moved to a new location, such as when an employee's office is moved, or when a laptop is moved to a conference room. In one case, a robotic devices such as drones move around in a self-powered manner.

Figure 7:
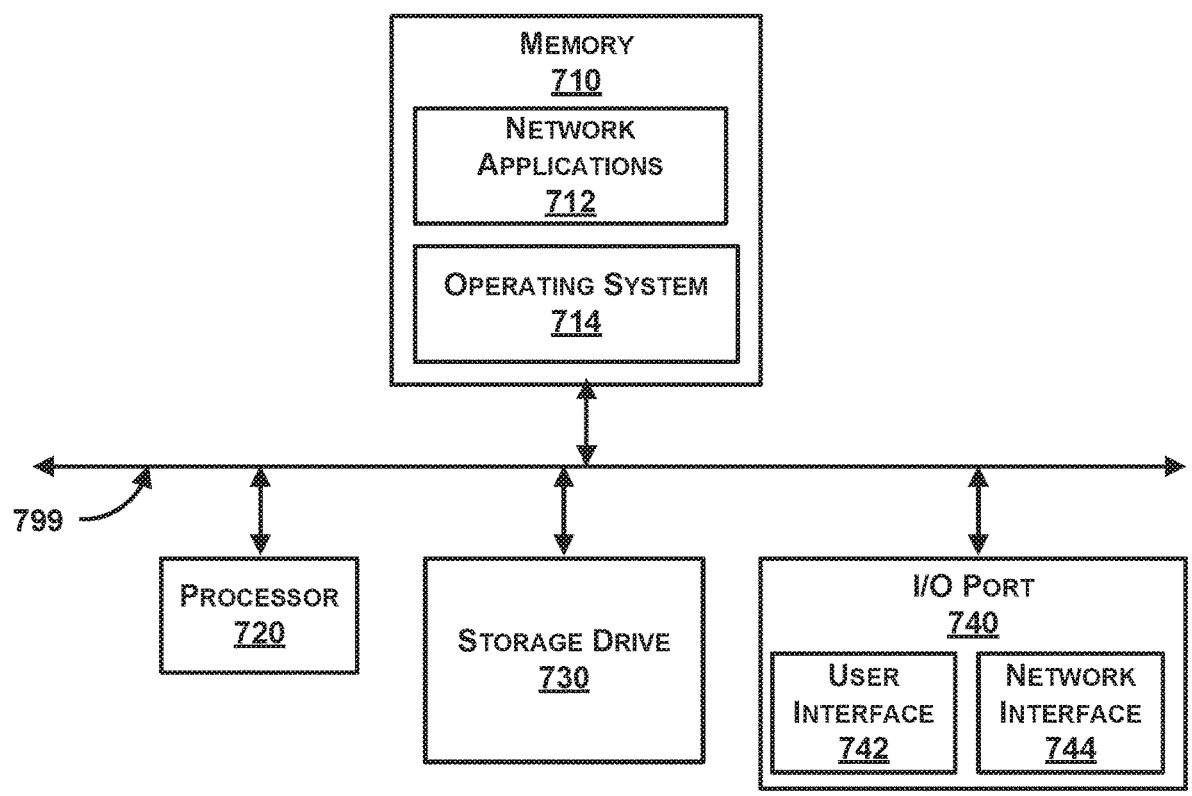
FIG. 7 is a block diagram illustrating an exemplary computing device, according to one embodiment.

The stations 130A-C can be, for example, a personal computer, a laptop computer, a tablet computer, a smart phone, a mobile computing device, a server, a cloud-based device, a virtual device, an Internet appliance, or any of the computing devices described herein (see e.g., FIG. 7). No special client is needed for this particular technique, although other aspects of the network may require downloads to the stations 130A-C. The stations 130A-C access, for example, a LAN (local area network) or external networks using an RF (radio frequency) antenna and network software complying with IEEE 802.11. Details about the stations 130A-C are set forth in FIG. 4.

In optional embodiments, the Wi-Fi controller 110 participates in station grouping either directly or indirectly. The Wi-Fi controller 110 can track mobility profiles and establish beamforming groups for the entire system 100 of one implementation. The access points 120A,B are passive devices that pass through data for beamforming measurements and the like. A light version of the Wi-Fi controller 110 offloads more tasks to the access points 120A,B in a different implementation. The Wi-Fi controller 110 bridges data between the access points 120A,B so that when a handoff occurs, a new access point has historical data for processing to track profiles and establish groups.

In one embodiment, the Wi-Fi controller 110 having a network-wide view of the system 100 can coordinate such that certain access points operate using MU-MIMO with beamforming while other access points operate using SU-MIMO with beamforming. In other words, the Wi-Fi controller 110 can direct which access point serves a particular station based on mobility profile. In seamless mobility implementations, access points share a BSSID, so the Wi-Fi controller 110 associates certain MACs (media access controllers) with a particular access point that should respond even though others are capable of responding. In virtual port implementations, stations have unique and persistent BSSIDs that are not shared, so the Wi-Fi controller 110 can associated the BSSID with a particular access point.

The Wi-Fi controller 110 can be implemented in any of the computing devices discussed herein (e.g., see FIG. 9). For example, the cloud-based Wi-Fi controller 140 can be an MC1500 or MC6000 device (e.g., modified) by Meru Networks of Sunnyvale, Calif. Additional functionalities of the Wi-Fi controller 110 include management of the access points 120A,B. Further, virtual cell and virtual port services leverage the network-wide view of the system 100 available to the Wi-Fi controller 110. More embodiments of the cloud-based Wi-Fi controller 110 are discussed with respect to FIG. 5.

Figure 2:
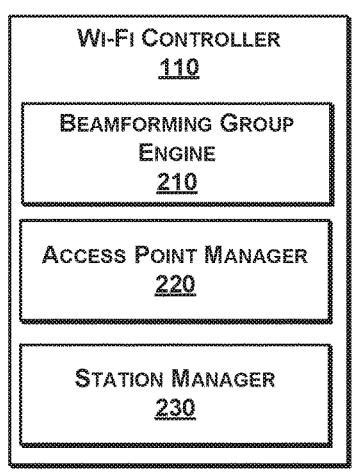
FIG. 2 is a more detailed block diagram illustrating a controller of the system of FIG. 1, according to one embodiment.

FIG. 2 is a more detailed block diagram illustrating the Wi-Fi controller 110, according to an embodiment. The Wi-Fi controller 110 comprises a beamforming group engine 210, an access point manager 220, and a station manager 230.

The beamforming group engine 210 forms and adjust groups of stations that are optimized for beamforming transmissions. In some implementations, the beamforming group engine 210 uses network-wide leverages information from the top of the network architecture of the system 100 to coordinate beamforming groups. In other implementations, the group engine 210 stores a database history for various connections around the system 100 for stations, and uses this historical information for future grouping in future connections. In further implementations, the beamforming engine 210 does not exist and all operations are performed at an access point level.

The access point manager 220 communicates with a group of access points for Wi-Fi functionality such as assigning BSSIDs and transferring stations between access points. The station manager 230 tracks specific stations and assigned parameters along with movement around the network. Virtual cell and/ or virtual port services can be associated with specific stations.

Figure 3:
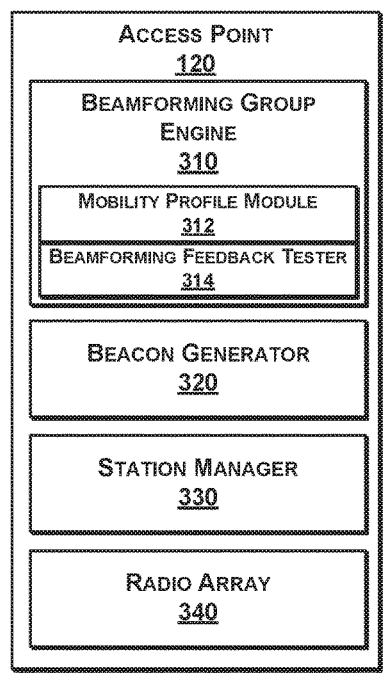
FIG. 3 is a more detailed block diagram illustrating an access point of the system of FIG. 1, according to one embodiment.

FIG. 3 is a more detailed block diagram illustrating an access point 120 (representing either of the access points 120A,B), according to an embodiment. The access point 120 comprises a beamforming group engine 310, a beacon generator 320, station manager 330, and a radio array 340. The components can be implemented in hardware, software, or a combination of both.

The beamforming group engine 310 further comprises a mobile profile module 312 to determine mobility profiles of stations. Additionally, a beamforming feedback tester 314 determines how to send signals based on current station conditions. When using SU-MIMO only a single station is involved. But when using the more complex MU-MIMO, each station contributes. In one example, SU-MIMO a feedback matrix is calculated based on information sent from a station in a reply frame to an NDP (null data packet) frame sent by an access point. For MU-MIMO, IEEE 802.11ac uses an extended version of the channel sounding exchange to produce a steering matrix from multiple feedback matrices of stations. A steering matrix includes every path between each of the access point antenna element and every station antenna element.

The beacon generator 320 generates beacons with embedded BSSIDs and parameters, according to IEEE 802.11 protocols. The station manager 330 stores globally and/ or locally-influenced parameter values, policy-based parameter values, manually configured parameter values, or the like, for stations and/or BSSIDs. The radio array 340 includes MU-MIMIO and SU-MIMO capable antenna. Each transmission of a steering matrix can be separately modulated.

Figure 4:
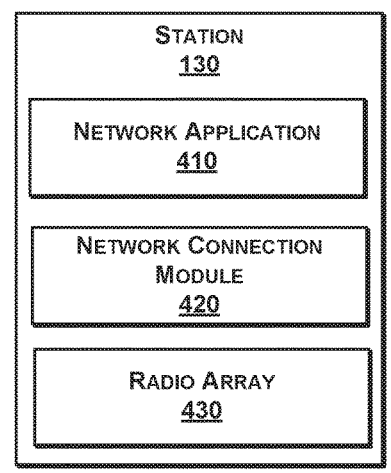
FIG. 4 is a more detailed block diagram illustrating a station of the system of FIG. 1, according to one embodiment.

FIG. 4 is a more detailed block diagram illustrating a station 130 (representing any of the stations 130A-C), according to one embodiment. The station 130 includes a network application 410 such as a browser, VOIP (voice over IP) application or other network-based application that may be used by an operator. A network connection module 420 establishes and maintains network connectivity with access points. A radio array 430 can comprise an IEEE 802.11 radio, a Bluetooth radio, a 4G radio or the like, for wireless channel access.

Figure 5:
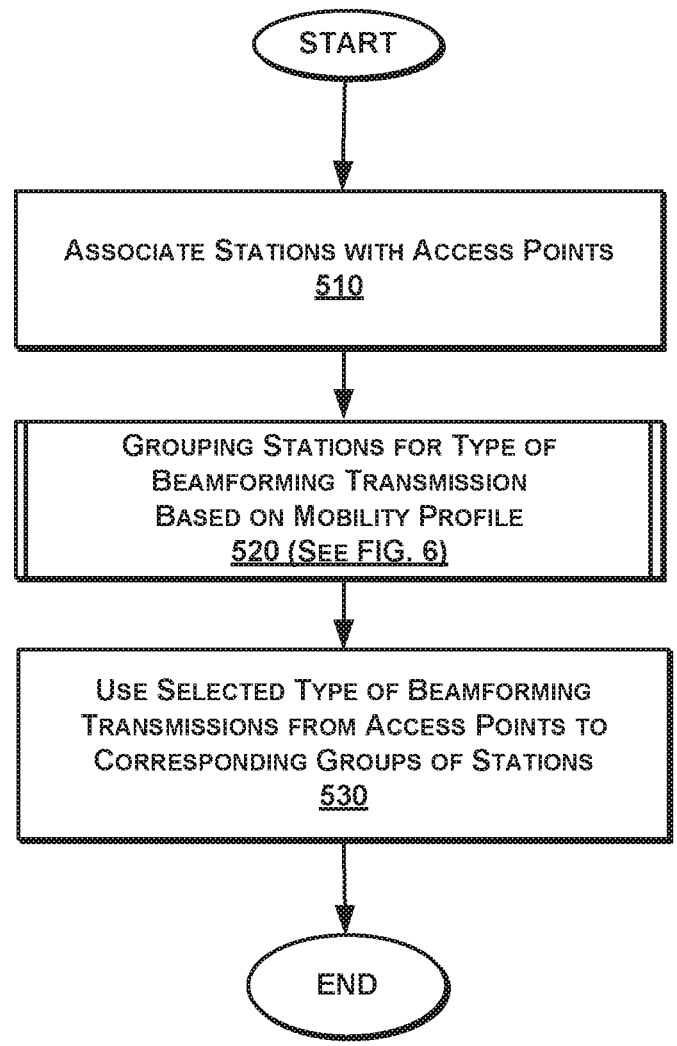
FIG. 5 is a block diagram illustrating a method for grouping stations in a Wi-Fi network based on mobility, according to one embodiment.
Figure 6:
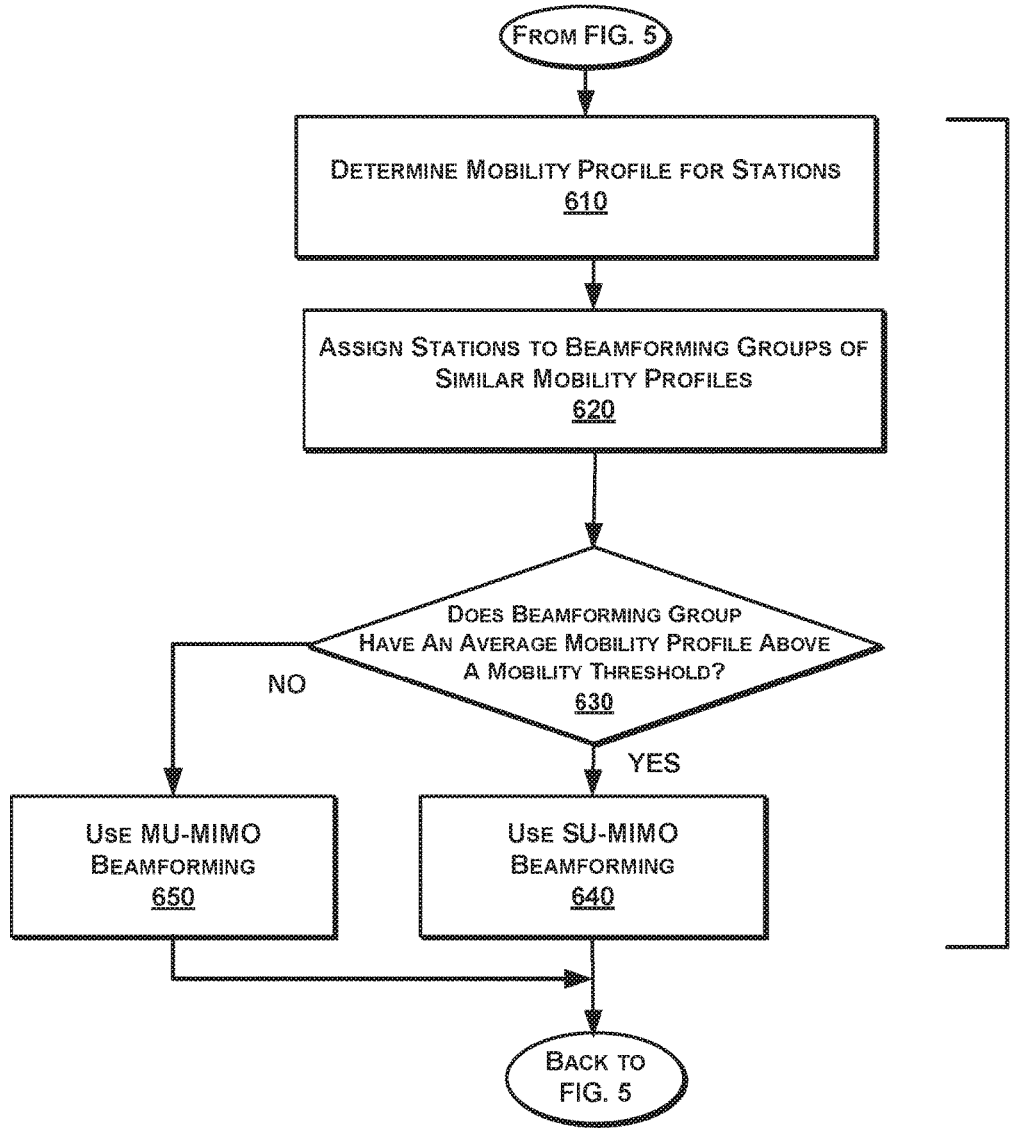
FIG. 6 is a more detailed block diagram illustrating the step for selecting an access point for handing-off a station, from the method of FIG. 5, according to one embodiment.

Methods for Grouping Stations Based on Mobility Profiles (FIG. 5-6)

FIG. 5 is a block diagram illustrating a method 500 for grouping stations in a Wi-Fi network based on mobility profiles, according to one embodiment. One of ordinary skill in the art will recognize that the method 500 is non-limiting as other embodiments can have more or less steps and can be performed in a different order. The method 500 can be implemented in the system 100 of FIG. 1 or in other components.

Stations are associated with access points for access to a backbone network (step 510). Stations are grouped based on mobility profile for a type of beamforming transmission (step 520), as detailed below in association with FIG. 6. Selected types of beamforming transmissions are used from access points to corresponding groups of stations (step 530).

FIG. 6 is a more detailed block diagram illustrating the step 520 for grouping stations, from the method of FIG. 5, according to one embodiment.

A mobility profile for stations is determined (step 620). Stations are assigned to beamforming groups of similar mobility profiles (step 630). If a beamforming group has an average mobility profile above a mobility threshold (step 610), a SU-MIMO beamforming mode is selected (step 640) rather than a MU-MIMO beamforming mode if the threshold is not exceeded (step 650).

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including Wi-Fi controller 110, the access points 1120A,B, and the stations 130A-C. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the SDN controller access point 110, the access points 120A, B, the cloud-based Wi-Fi controller 140, or the station 130, as illustrated in FIGS. 1-4. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 75, 78, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in an access point having MU-MIMO capability, for automatically grouping stations into groups to optimize Wi-Fi beamforming transmissions over a communication network, the method comprising the steps of:
    associating with stations of a plurality of stations over a Wi-Fi portion of the communication network, wherein the stations have MU-MIMO capability;
    determining a mobility profile for each station of the plurality of stations, the mobility profile including factors that characterize at least an amount of movement and current location for a station;
    assigning each station to a beamforming group, each station of the beamforming group having similar mobility profiles, comprising determining a type of device for stations of the plurality of stations, and initially assigning stations based on the type of device having an assumed mobility profile;
    selecting a type of beamforming transmission for each beamforming group based on mobility profiles of associated stations, the type of beamforming transmissions including at least MU-MIMO and SU-MIMO; and
    transmitting data to the stations of each beamforming group according to the selected type of beamforming transmissions.

2. The method of claim 1, wherein selecting a type of beamforming transmission, further comprises:
    selecting MU-MIMO type of beamforming transmission for beamforming groups having an average mobility profile above a mobility threshold, comprising measuring RSSI values of the plurality of stations at different points in time, and detecting a movement responsive to a change in the RSSI values of the plurality of stations at the different points in time; and
    selecting SU-MIMO type of beamforming transmissions for beamforming groups having an average mobility profile below a mobility threshold.

3. The method of claim 1, wherein transmitting data to the stations, further comprises:
    measuring beamforming feedback for the stations for a group characterized by high mobility;
    responsive to the measured feedback, determining a first beamforming characteristics;
    transmitting to a beamforming group using the first beamforming characteristics; and
    periodically adjusting the first beamforming characteristics based on updated measurements of beamforming feedback.

4. The method of claim 3, wherein transmitting the data to the stations, further comprises:
    measuring beamforming feedback for the stations for a group characterized by low mobility;
    responsive to the measured feedback, determining a second beamforming characteristics;
    transmitting to a beamforming group using the second beamforming characteristics; and
    periodically adjusting the second beamforming characteristics based on updated measurements of beamforming feedback, wherein periods between periodic adjustments for the second beamforming group is longer than periods between periodic adjustments of the first beamforming group.

5. The method of claim 1, wherein transmitting the data to the stations, further comprises:
    measuring beamforming feedback for the stations for a third beamforming group characterized by low mobility;
    responsive to the measured feedback, determining a third beamforming characteristics; and
    transmitting to a beamforming group characterized by low mobility without periodically adjusting the third beamforming characteristics based on updated measurement of beamforming feedback.

6. The method of claim 1, wherein assigning each station to a beamforming group, further comprises:
    measuring beamforming feedback for the stations for a group characterized by high mobility;
    responsive to the measured feedback, determining a third beamforming characteristics;
    transmitting to a beamforming group using the third beamforming characteristics, including using SU-MIMO data streams for transmissions despite having the MU-MIMO capability.

7. The method of claim 1, wherein transmitting data to the stations, further comprises:
    transmitting includes beamforming to send frames to spatially diverse locations at the same time, wherein different beamforming characteristics are utilized for different locations.

8. The method of claim 1, wherein determining a location for the mobility profile, further comprises:
    measuring RSSI values of the plurality of stations.

9. The method of claim 1, wherein assigning each station to a beamforming group, further comprises:
    defining each beamforming group of a plurality of beamforming groups with an amount of mobility.

10. The method of claim 1, wherein assigning each station to a beamforming group, further comprises:
    determining a type of user for stations of the plurality of stations; and
    initially assigning stations based on the type of user having an assumed mobility profile.

11. The method of claim 1, wherein determining the mobility profile, further comprises:
    retrieving a previously assigned category for at least one station from a database.

12. The method of claim 1, wherein assigning each station to a beamforming group, further comprises:
    retrieving a previously assigned beamforming group from a database.

13. The method of claim 1, wherein assigning each station to a beamforming group, further comprises:
    receiving a device type for at least one station of the plurality of station,
    wherein assigning each station to a beamforming group comprises assigning the at least one station of the plurality of stations based on the device type.

14. The method of claim 1, wherein the access points operates according to at least one of IEEE 802.11n, IEEE 802.11 ac wave 2, and a Wi-Fi protocol that supports beamforming.

15. A non-transitory computer-readable medium storing source code that, when executed by a processor, performs a method in an access point for automatically grouping stations into groups to optimize Wi-Fi beamforming transmissions over a communication network, the method comprising the steps of:

associating with stations of a plurality of stations over a Wi-Fi portion of the communication network, wherein the stations have MU-MIMO capability;

determining a mobility profile for each station of the plurality of stations, the mobility profile including factors that characterize at least an amount of movement and current location for a station;

assigning each station to a beamforming group, each station of the beamforming group having similar mobility profiles, comprising determining a type of device for stations of the plurality of stations, and initially assigning stations based on the type of device having an assumed mobility profile;

selecting a type of beamforming transmission for each beamforming group based on mobility profiles of associated stations, the type of beamforming transmissions including at least MU-MIMO and SU-MIMO; and transmitting data to the stations of each beamforming group according to the selected type of beamforming transmissions.

16. An access point for automatically grouping stations into groups to optimize Wi-Fi beamforming transmissions over a communication network, the access point comprising:

a processor; and a memory, storing:

a first module to associate with stations of a plurality of stations over a Wi-Fi portion of the communication network, wherein the stations have MU-MIMO capability;

a second module to determine a mobility profile for each station of the plurality of stations, the mobility profile including factors that characterize at least an amount of movement and current location for a station;

a third module to assign each station to a beamforming group, each station of the beamforming group having similar mobility profiles, comprising determining a type of device for stations of the plurality of stations, and initially assigning stations based on the type of device having an assumed mobility profile;

a fourth module to select a type of beamforming transmission for each beamforming group based on mobility profiles of associated stations, the type of beamforming transmissions including at least MU-MIMO and SU-MIMO; and transmitting data to the stations of each beamforming group according to the selected type of beamforming transmission group.

\* \* \* \* \*